(12) United States Patent
Zhang et al.

(10) Patent No.: US 11,303,400 B2
(45) Date of Patent: Apr. 12, 2022

(54) INFORMATION TRANSMISSION METHOD AND APPARATUS

(71) Applicant: HUAWEI TECHNOLOGIES CO., LTD., Guangdong (CN)

(72) Inventors: Xu Zhang, Beijing (CN); Yan Cheng, Beijing (CN); Lixia Xue, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 16/367,864

(22) Filed: Mar. 28, 2019

(65) Prior Publication Data

US 2019/0222370 A1  Jul. 18, 2019

Related U.S. Application Data

(63) Continuation of application No. PCT/CN2017/100732, filed on Sep. 6, 2017.

(30) Foreign Application Priority Data

Sep. 28, 2016 (CN) .......................... 201610860638.1

(51) Int. Cl.
*H04W 72/04* (2009.01)
*H04L 5/00* (2006.01)
(Continued)

(52) U.S. Cl.
CPC ........... *H04L 5/0007* (2013.01); *H04W 24/10* (2013.01); *H04W 28/02* (2013.01); *H04W 72/04* (2013.01);
(Continued)

(58) Field of Classification Search
None
See application file for complete search history.

(56) References Cited

U.S. PATENT DOCUMENTS

| | | | |
|---|---|---|---|
| 2014/0105158 A1* | 4/2014 | Kim | H04L 1/1854 370/329 |
| 2014/0204807 A1 | 7/2014 | Li et al. | |

(Continued)

FOREIGN PATENT DOCUMENTS

| | | |
|---|---|---|
| CN | 1719928 A | 1/2006 |
| CN | 1780457 A | 5/2006 |

(Continued)

OTHER PUBLICATIONS

NTT DOCOMO, INC.,"Initial views on frame structure for NR access technology",3GPP TSG RAN WG1 Meeting #84bis R1-163112,Busan, Korea Apr. 11-15, 2016,total 7 pages.
(Continued)

*Primary Examiner* — Jenkey Van
(74) *Attorney, Agent, or Firm* — Fish & Richardson P.C.

(57) ABSTRACT

Embodiments of this application provide an information transmission method and apparatus. The method includes: receiving system information from a base station, wherein the system information comprises first configuration information, wherein the first configuration information is used to indicate a fixed-downlink time-frequency resource and a fixed-uplink time-frequency resource, or that a type of each unit time-frequency resource is not limited, and the type of the unit time-frequency resource comprises the unit time-frequency resource used to send uplink information, the unit time-frequency resource used to receive downlink information, or the unit time-frequency resource used to send uplink information and receive downlink information.

6 Claims, 9 Drawing Sheets

(51) Int. Cl.
*H04W 24/10* (2009.01)
*H04W 28/02* (2009.01)
*H04W 72/08* (2009.01)

(52) U.S. Cl.
CPC ....... *H04W 72/042* (2013.01); *H04W 72/044* (2013.01); *H04W 72/0446* (2013.01); *H04W 72/08* (2013.01); *H04W 72/0413* (2013.01); *H04W 72/082* (2013.01)

(56) References Cited

U.S. PATENT DOCUMENTS

| | | | |
|---|---|---|---|
| 2015/0117294 A1* | 4/2015 | Li | H04W 72/0446 370/312 |
| 2015/0124663 A1* | 5/2015 | Chen | H04L 5/0073 370/278 |
| 2015/0146587 A1 | 5/2015 | Nagata et al. | |
| 2015/0188690 A1* | 7/2015 | Khoryaev | H04L 5/0051 370/280 |
| 2016/0007347 A1 | 1/2016 | Nagata et al. | |
| 2016/0056947 A1* | 2/2016 | Tiirola | H04B 7/0456 370/280 |
| 2016/0119948 A1* | 4/2016 | Damnjanovic | H04W 72/14 370/280 |
| 2016/0352455 A1 | 12/2016 | Li et al. | |
| 2017/0257860 A1* | 9/2017 | Nam | H04W 72/0446 |
| 2017/0310447 A1* | 10/2017 | Kusashima | H04W 72/044 |
| 2018/0205534 A1* | 7/2018 | Yi | H04J 3/02 |
| 2018/0359751 A1* | 12/2018 | Ko | H04W 72/0446 |
| 2019/0014576 A1* | 1/2019 | Liao | H04W 72/1205 |
| 2019/0098626 A1* | 3/2019 | Yi | H04W 72/0473 |

FOREIGN PATENT DOCUMENTS

| | | |
|---|---|---|
| CN | 102158325 A | 8/2011 |
| CN | 103312650 A | 9/2013 |
| CN | 104144503 A | 11/2014 |
| JP | 2016509796 A | 3/2016 |
| JP | 2018510534 | 4/2018 |
| WO | 2016122845 A1 | 8/2016 |

OTHER PUBLICATIONS

PCT International Search Report in International Appln. No. PCT/CN, dated Nov. 30, 2017, 6 pages (with English translation).
Office Action issued in Japanese Application No. 2019-538,300 dated Apr. 7, 2020, 16 pages (With English Translation).
Office Action issued in Japanese Application No. 2019-538300 dated Aug. 3, 2021, 9 pages (with English translation).
Extended European Search Report issued in European Application No. 17854652.9 dated Jul. 30, 2019, 9 pages.
R1-164032—Huawei et al., "Discussion on frame structure for NR," 3GPP TSG RAN WG1 Meeting #85, Nanjing, China, XP051089779, May 23-27, 2016, 8 pages.

* cited by examiner

INFORMATION TRANSMISSION METHOD AND APPARATUS

CROSS-REFERENCE TO RELATED APPLICATIONS

This application is a continuation of International Application No. PCT/CN 2017/100732, filed on Sep. 6, 2017, which claims priority to Chinese Patent Application No. 201610860638.1, filed on Sep. 28, 2016. The disclosures of the aforementioned applications are hereby incorporated by reference in their entireties.

TECHNICAL FIELD

Embodiments of this application relate to the Internet technologies, and in particular, to an information transmission method and apparatus.

BACKGROUND

A Long Term Evolution (LTE) system standard formulated by the 3rd Generation Partnership Project (3GPP) is considered as a 4th generation wireless access system standard. The 4th generation wireless access system standard includes a time division duplex (TDD) access manner. A 5th generation wireless access system also continues to support the TDD access manner.

For example, in an LTE system, three subframe types are defined for the TDD access manner: a downlink subframe, an uplink subframe, and a special subframe. A subframe configuration manner is stipulated in the standard for a radio frame based on the three types of subframes. A radio frame including 10 subframes is used as an example. Totally seven possible subframe combination types are included, as shown in Table 1:

TABLE 1

| TDD uplink/downlink configuration manner | | | | | | | | | | |
|---|---|---|---|---|---|---|---|---|---|---|
| Uplink/downlink | Subframe number | | | | | | | | | |
| configuration type | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D represents a downlink subframe, U represents an uplink subframe, and S represents a special subframe. It can be learned from Table 1 that, in each radio frame, a subframe 0 and a subframe 5 are defined as downlink subframes and do not vary with an uplink/downlink configuration type. User equipment may determine, based on the information, that resources in the entire subframe 0 and subframe 5 are all downlink transmission resources. Therefore, the user equipment preferentially detects control channels in the two subframes before obtaining any system information, and obtains basic system information, to access a system. After obtaining system information in the subframe 5, the user equipment determines a time-frequency resource configuration manner of the entire radio frame, and the user equipment may further determine, based on the configuration manner, specific resource locations at which a downlink reference signal is detected and an uplink trigger signal is sent. Then, the user equipment may send a corresponding signal at the uplink resource location or detect a corresponding signal at the downlink resource location, and efficiently access the system.

The user equipment can access the system by using an uplink/downlink resource configuration type in the foregoing TDD access manner. However, the uplink/downlink resource configuration type shown in Table 1 is predefined. Consequently, when an uplink-downlink service ratio does not match the predefined uplink/downlink resource configuration type, there is a waste of time-frequency resources. For example, when there are few downlink services but many uplink services, a manner of a configuration 2 in Table 1 is used. In other words, when uplink time-frequency resources are fewer than downlink time-frequency resources, no service is carried on reserved downlink time-frequency resources. Instead, many services are carried on the few reserved uplink time-frequency resources. In this case, if system information is used to instruct to change an uplink-downlink resource configuration ratio, namely, to change a subframe configuration type, a response time is excessively long. Consequently, a dynamic resource change does not match a service change in time, an uplink service delay is eventually increased, and quality of service is lowered.

SUMMARY

Embodiments of this application provide an information transmission method and apparatus, to resolve the following problems: when the foregoing TDD access manner is used, if system information is used to instruct to change an uplink-downlink resource configuration ratio, namely, to change a subframe configuration type, a response time is excessively long, and consequently, a dynamic resource change does not match a service change in time, an uplink service delay is eventually increased, and quality of service is lowered.

A first aspect of this application provides an information transmission method, including:

receiving, by user equipment, system information sent by a base station, wherein the system information includes first configuration information used to indicate a fixed-downlink time-frequency resource and a fixed-uplink time-frequency resource; and based on the first configuration information, obtaining, by the user equipment, information on the fixed-downlink time-frequency resource or configuring information to be carried on the fixed-uplink time-frequency resource.

In this solution, the fixed-uplink time-frequency resource or the fixed-downlink time-frequency resource is one or several orthogonal frequency division multiplexing (OFDM) symbols of a unit time-frequency resource. A quantity of OFDM symbols of the fixed-uplink time-frequency resource or the fixed-downlink time-frequency resource is less than a quantity of OFDM symbols of the unit time-frequency resource, and the quantity of OFDM symbols of the unit time-frequency resource is fixed. The unit time-frequency resource may be one or more minimum scheduling units and is not specifically limited. In this solution, a type of each unit time-frequency resource is not limited.

The base station indicates the fixed uplink and downlink time-frequency resources by using the first configuration information in the system information, but does not indicate the specific type of the unit time-frequency resource. The base station may dynamically configure the type of each unit time-frequency resource in a subsequent information transmission process, in other words, support a dynamic change of a minimum unit uplink/downlink time-frequency resource. This avoids a waste of time-frequency resources when an uplink-downlink service ratio does not match a predefined uplink/downlink resource configuration type. In addition, the base station does not predefine an uplink-downlink resource configuration ratio, but may dynamically configure an uplink-downlink time-frequency resource ratio based on a service status subsequently. This ensures a relatively low access delay of the user equipment, rapidly changes a time-frequency resource dynamically, and improves quality of service.

Specifically, the first configuration information is further used to indicate that a type of each unit time-frequency resource is not limited. The unit time-frequency resource includes a fixed quantity of OFDM symbols, and the type includes the unit time-frequency resource used to send uplink information, the unit time-frequency resource used to receive downlink information, or the unit time-frequency resource used to send uplink information and receive downlink information.

In this solution, the first configuration information indicates only a transmission direction of the one or several OFDM symbols of the unit time-frequency resource, and indicates that the type of each unit time-frequency resource is not limited; and the type of the unit time-frequency resource may be specifically indicated based on downlink control information in the subsequent transmission process.

After the receiving system information that is sent by a base station and that includes first configuration information, the method further includes:

sending, by the user equipment, information to the base station based on the fixed-uplink time-frequency resource; and/or receiving, by the user equipment based on the fixed-downlink time-frequency resource, information sent by the base station.

Optionally, the method further includes:

receiving, by the user equipment, downlink control information sent by the base station on the fixed-downlink time-frequency resource, where the downlink control information is used to indicate a type of at least one unit time-frequency resource; and determining, by the user equipment, the type of each unit time-frequency resource based on the downlink control information, where the unit time-frequency resource includes the fixed quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

For example, a subframe is a unit time-frequency resource. A type of the unit time-frequency resource herein includes: an uplink subframe, that is, the unit time-frequency resource used to send uplink information; a downlink subframe, that is, the unit time-frequency resource used to receive downlink information; and a primary uplink subframe or a primary downlink subframe, that is, the unit time-frequency resource used to send uplink information and receive downlink information.

Based on any one of the foregoing solutions, the fixed-downlink time-frequency resource is at least one OFDM symbol that starts from a start location of a unit time-frequency resource in time domain, and the fixed-uplink time-frequency resource is at least one OFDM symbol that ends at an end location of a unit time-frequency resource in time domain. For example, the fixed-uplink time-frequency resource is the last one or two OFDM symbols of a subframe, and the fixed-downlink time-frequency resource is the first one or two OFDM symbols of a subframe.

Based on any one of the foregoing solutions, the method further includes:

receiving, by the user equipment, system information that is sent by the base station and that includes second configuration information, where the second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

Before the receiving, by the user equipment, system information that is sent by the base station and that includes second configuration information, the method further includes:

sending, by the user equipment, a channel state measurement report to the base station, where the channel state measurement report includes a signal-to-noise ratio of a downlink signal.

A meaning of the foregoing solution is that the base station indicates the fixed-uplink time-frequency resource and the fixed-downlink time-frequency resource by using the system information, and subsequently determines the type of each unit time-frequency resource in a dynamic indication manner.

The base station may obtain interference intensity in real time based on the signal-to-noise ratio, and determine, based on the interference intensity in a signal transmission process, whether to continue to use a dynamic TDD manner. If interference is relatively strong, the base station may further send the system information including the second configuration information to directly indicate the type of each unit time-frequency resource. Flexible switching can be performed between a dynamic TDD system and a semi-persistent TDD system. When system load is relatively high or the interference is relatively strong, the semi-persistent TDD system is used. This effectively ensures system performance.

A second aspect of this application provides an information transmission method, including:

obtaining, by a base station, system information, where the system information includes first configuration information used to indicate a fixed-downlink time-frequency resource and a fixed-uplink time-frequency resource; and sending, by the base station, the system information to user equipment, so that based on the first configuration information, the user equipment obtains information on the fixed-downlink time-frequency resource or configures information to be carried on the fixed-uplink time-frequency resource.

Similar to the solution provided in the first aspect, the fixed-uplink time-frequency resource or the fixed-downlink time-frequency resource is one or several OFDM symbols of a unit time-frequency resource, and a quantity of OFDM symbols of the fixed-uplink time-frequency resource or the fixed-downlink time-frequency resource is less than a quantity of OFDM symbols of the unit time-frequency resource.

Specifically, the first configuration information is further used to indicate that a type of each unit time-frequency resource is not limited, the unit time-frequency resource includes a fixed quantity of OFDM symbols, and the type includes the unit time-frequency resource used to send uplink information, the unit time-frequency resource used to receive downlink information, or the unit time-frequency resource used to send uplink information and receive downlink information.

In this solution, the first configuration information indicates only a transmission direction of the one or several OFDM symbols of the unit time-frequency resource, and indicates that the type of each unit time-frequency resource is not limited; and the base station specifically indicates the type of the unit time-frequency resource by using downlink control information in a subsequent transmission process.

Further, the method further includes:

receiving, by the base station, information sent by the user equipment on the fixed-uplink time-frequency resource; and/or sending, by the base station, information to the user equipment on the fixed-downlink time-frequency resource.

Based on any one of the foregoing solutions, the method further includes:

sending, by the base station, downlink control information to the user equipment on the fixed-downlink time-frequency resource, so that the user equipment determines a type of at least one unit time-frequency resource based on the downlink control information, where the downlink control information is used to indicate the type of the at least one unit time-frequency resource, the unit time-frequency resource includes the fixed quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

In a specific implementation, the fixed-downlink time-frequency resource is at least one OFDM symbol that starts from a start location of a unit time-frequency resource in time domain, and the fixed-uplink time-frequency resource is at least one OFDM symbol that ends at an end location of a unit time-frequency resource in time domain.

Further, the method further includes:

obtaining, by the base station, interference intensity, where the interference intensity is used to indicate a degree of interference of a neighboring cell signal to uplink or downlink transmission of the base station; and when the interference intensity is greater than a preset interference intensity threshold, sending, by the base station, system information including second configuration information to the user equipment, where the second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

In this solution, the base station indicates the fixed-uplink time-frequency resource and the fixed-downlink time-frequency resource by using the system information. Subsequently, after determining the type of each unit time-frequency resource in a dynamic indication manner, the base station may obtain the interference intensity in real time based on a signal-to-noise ratio, and determine, based on the interference intensity in a signal transmission process, whether to continue to use a dynamic TDD manner. If interference is relatively strong, the base station may directly indicate the type of each unit time-frequency resource by further sending the system information including the second configuration information.

Optionally, the obtaining, by the base station, interference intensity includes:

measuring, by the base station, interference signal intensity of a neighboring cell at a predefined time-frequency resource location, and using the intensity as the interference intensity; or receiving, by the base station, a channel state measurement report sent by the user equipment, where the channel state measurement report includes a signal-to-noise ratio of a downlink signal; and obtaining, by the base station, the interference intensity based on the signal-to-noise ratio of the downlink signal; or receiving, by the base station, a channel sounding reference signal sent by the user equipment, and measuring uplink transmission channel quality based on the channel sounding reference signal, to obtain the interference intensity.

A third aspect of this application provides an information transmission method, including:

receiving, by user equipment, system information sent by a base station, where the system information includes second configuration information used to indicate a type of each unit time-frequency resource, the unit time-frequency resource includes a fixed quantity of OFDM symbols, and the type of the unit time-frequency resource includes: the unit time-frequency resource used to send uplink information, the unit time-frequency resource used to receive downlink information, or the unit time-frequency resource used to send uplink information and receive downlink information; and exchanging, by the user equipment, information with the base station based on the second configuration information.

In this solution, the user equipment receives the system information that is sent by the base station and that includes the second configuration information. In other words, the base station indicates the type of each unit time-frequency resource by using the system information. Different from the solution in the first aspect in which the fixed uplink and downlink transmission resources are indicated by symbols, the second configuration information indicates the type of each unit time-frequency resource. To be specific, the user equipment may determine the type of each unit time-frequency resource based on the second configuration information, and transmit information on a corresponding resource. For example, the user equipment sends uplink information and/or an uplink signal on the uplink time-frequency resource, or the user equipment receives downlink information and/or a downlink signal on the downlink time-frequency resource.

Based on the foregoing solution, the method further includes:

receiving, by the user equipment, system information that is sent by the base station and that includes first configuration information, where the first configuration information is used to indicate a fixed-downlink time-frequency resource and a fixed-uplink time-frequency resource; and based on the first configuration information, obtaining, by the user equipment, information carried on the fixed-downlink time-frequency resource or configuring information to be carried on the fixed-uplink time-frequency resource.

Optionally, before the receiving, by the user equipment, system information that is sent by the base station and that includes first configuration information, the method further includes:

sending, by the user equipment, a channel state measurement report to the base station, where the channel state measurement report includes a signal-to-noise ratio of a downlink signal.

On a basis that the type of each unit time-frequency resource is directly indicated by using the second configuration information, the base station obtains interference intensity in real time, and then determines, based on the interference intensity, whether to use a manner of dynamically determining the type. If the base station determines to use the manner of dynamically determining the type, the base station further sends the first configuration information to the user equipment by using the system information, to indicate the fixed-uplink time-frequency resource and the fixed-downlink time-frequency resource and indicate that the type of each unit time-frequency resource is not limited, and may indicate the type of each unit time-frequency resource by using downlink control information subsequently.

A fourth aspect of this application provides an information transmission method, including:

sending, by a base station, system information to user equipment, where the system information includes second configuration information used to indicate a type of each unit time-frequency resource, the unit time-frequency resource includes a fixed quantity of OFDM symbols, and the type of the unit time-frequency resource includes: the unit time-frequency resource used to send uplink information, the unit time-frequency resource used to receive downlink information, or the unit time-frequency resource used to send uplink information and receive downlink information; and exchanging, by the base station, information with the user equipment based on the second configuration information.

Optionally, the method further includes:

obtaining, by the base station, interference intensity, where the interference intensity is used to indicate a degree of interference of a neighboring cell signal to uplink or downlink transmission of the base station; and when the interference intensity is less than a preset interference intensity threshold, sending, by the base station, system information including first configuration information to the user equipment, where the first configuration information is used to indicate a fixed-downlink time-frequency resource and a fixed-uplink time-frequency resource.

Optionally, the obtaining, by the base station, interference intensity includes:

measuring, by the base station, interference signal intensity of a neighboring cell at a predefined time-frequency resource location, and using the intensity as the interference intensity; or receiving, by the base station, a channel state measurement report sent by the user equipment, where the channel state measurement report includes a downlink transmission signal-to-noise ratio; and obtaining, by the base station, the interference intensity based on the downlink transmission signal-to-noise ratio; or receiving, by the base station, a channel sounding reference signal sent by the user equipment, and measuring uplink transmission channel quality based on the channel sounding reference signal, to obtain the interference intensity.

A fifth aspect of this application provides an information transmission apparatus, including:

a receiving module, configured to receive system information sent by a base station, where the system information includes first configuration information used to indicate a fixed-downlink time-frequency resource and a fixed-uplink time-frequency resource; and a processing module, configured to: based on the first configuration information, obtain information on the fixed-downlink time-frequency resource or configure information to be carried on the fixed-uplink time-frequency resource.

Optionally, the first configuration information received by the receiving module is further used to indicate that a type of each unit time-frequency resource is not limited, the unit time-frequency resource includes a fixed quantity of OFDM symbols, and the type includes the unit time-frequency resource used to send uplink information, the unit time-frequency resource used to receive downlink information, or the unit time-frequency resource used to send uplink information and receive downlink information.

Optionally, the apparatus further includes a sending module, where the sending module is configured to send information to the base station based on the fixed-uplink time-frequency resource; and/or the receiving module is further configured to receive, based on the fixed-downlink time-frequency resource, information sent by the base station.

Optionally, the receiving module is further configured to receive downlink control information sent by the base station on the fixed-downlink time-frequency resource, where the downlink control information is used to indicate a type of at least one unit time-frequency resource; and the processing module is further configured to determine the type of each unit time-frequency resource based on the downlink control information.

The unit time-frequency resource includes the fixed quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the fixed-downlink time-frequency resource indicated by the first configuration information received by the receiving module is at least one OFDM symbol that starts from a start location of a unit time-frequency resource in time domain, and the fixed-uplink time-frequency resource is at least one OFDM symbol that ends at an end location of a unit time-frequency resource in time domain.

Optionally, the receiving module is further configured to receive system information that is sent by the base station and that includes second configuration information, where the second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the sending module is further configured to send a channel state measurement report to the base station, where the channel state measurement report includes a signal-to-noise ratio of a downlink signal.

The information transmission apparatus provided in the fifth aspect may be specifically implemented as user equipment, the receiving module may be implemented as a receiver, the sending module may be implemented as a transmitter, the processing module may be implemented as a processor, and the user equipment includes a memory that may store program code.

A sixth aspect of this application provides an information transmission apparatus, including:

a processing module, configured to obtain system information, where the system information includes first configuration information used to indicate a fixed-downlink time-frequency resource and a fixed-uplink time-frequency resource; and a sending module, configured to send the system information to user equipment, so that based on the first configuration information, the user equipment obtains information on the fixed-downlink time-frequency resource or configures information to be carried on the fixed-uplink time-frequency resource.

Optionally, the first configuration information obtained by the processing module is further used to indicate that a type of each unit time-frequency resource is not limited, the unit time-frequency resource includes a fixed quantity of OFDM symbols, and the type includes the unit time-frequency resource used to send uplink information, the unit time-frequency resource used to receive downlink information, or the unit time-frequency resource used to send uplink information and receive downlink information.

Optionally, the apparatus further includes a receiving module, where the receiving module is configured to receive information sent by the user equipment on the fixed-uplink time-frequency resource; and/or the sending module is further configured to send information to the user equipment on the fixed-downlink time-frequency resource.

Optionally, the sending module is further configured to send downlink control information to the user equipment on the fixed-downlink time-frequency resource, so that the user equipment determines a type of at least one unit time-frequency resource based on the downlink control information. The downlink control information is used to indicate the type of the at least one unit time-frequency resource, the unit time-frequency resource includes the fixed-quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the fixed-downlink time-frequency resource is at least one OFDM symbol that starts from a start location of a unit time-frequency resource in time domain, and the fixed-uplink time-frequency resource is at least one OFDM symbol that ends at an end location of a unit time-frequency resource in time domain.

Optionally, the processing module is further configured to obtain interference intensity, where the interference intensity is used to indicate a degree of interference of a neighboring cell signal to uplink or downlink transmission of a base station; and when the processing module determines that the interference intensity is greater than a preset interference intensity threshold, the sending module is further configured to send system information including second configuration information to the user equipment, where the second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the processing module is specifically configured to: measure interference signal intensity of a neighboring cell at a predefined time-frequency resource location, and use the intensity as the interference intensity; or the receiving module is further configured to receive a channel state measurement report sent by the user equipment, where the channel state measurement report includes a signal-to-noise ratio of a downlink signal; and the processing module is further configured to obtain the interference intensity based on the signal-to-noise ratio of the downlink signal; or the receiving module is further configured to: receive a channel sounding reference signal sent by the user equipment, and measure uplink transmission channel quality based on the channel sounding reference signal, to obtain the interference intensity.

The information transmission apparatus provided in the sixth aspect may be specifically implemented as the base station, the receiving module may be implemented as a receiver, the sending module may be implemented as a transmitter, the processing module may be implemented as a processor, and the base station includes a memory that may store program code.

A seventh aspect of this application provides an information transmission apparatus, including:

a receiving module, configured to receive system information sent by a base station, where the system information includes second configuration information used to indicate a type of each unit time-frequency resource, the unit time-frequency resource includes a fixed quantity of OFDM symbols, and the type of the unit time-frequency resource includes: the unit time-frequency resource used to send uplink information, the unit time-frequency resource used to receive downlink information, or the unit time-frequency resource used to send uplink information and receive downlink information; and a processing module, configured to control the information transmission apparatus to exchange information with the base station based on the second configuration information.

Optionally, the receiving module is further configured to receive system information that is sent by the base station and that includes first configuration information, where the first configuration information is used to indicate a fixed-downlink time-frequency resource and a fixed-uplink time-frequency resource; and the processing module is further configured to: based on the first configuration information, obtain information on the fixed-downlink time-frequency resource or configure information to be carried on the fixed-uplink time-frequency resource.

Optionally, the apparatus further includes a sending module, configured to send a channel state measurement report to the base station, where the channel state measurement report includes a signal-to-noise ratio of a downlink signal.

The information transmission apparatus provided in the seventh aspect may be specifically implemented as user equipment, the receiving module may be implemented as a receiver, the sending module may be implemented as a transmitter, the processing module may be implemented as a processor, and the user equipment includes a memory that may store program code.

An eighth aspect of this application provides an information transmission apparatus, including:

a sending module, configured to send system information to user equipment, where the system information includes second configuration information used to indicate a type of each unit time-frequency resource, the unit time-frequency resource includes a fixed quantity of orthogonal frequency division multiplexing OFDM symbols, and the type of the unit time-frequency resource includes: the unit time-frequency resource used to send uplink information, the unit time-frequency resource used to receive downlink information, or the unit time-frequency resource used to send uplink information and receive downlink information; and a processing module, configured to control the information transmission apparatus to exchange information with the user equipment based on the second configuration information.

Optionally, the processing module is further configured to obtain interference intensity, where the interference intensity is used to indicate a degree of interference of a neighboring cell signal to uplink or downlink transmission of a base station; and when the processing module determines that the interference intensity is less than a preset interference intensity threshold, the sending module is further configured to send system information including first configuration information to the user equipment, where the first configuration information is used to indicate a fixed-downlink time-frequency resource and a fixed-uplink time-frequency resource.

Optionally, the apparatus further includes a receiving module, where the processing module is further configured to: measure interference signal intensity of a neighboring cell at a predefined time-frequency resource location, and use the intensity as the interference intensity; or the receiving module is configured to receive a channel state measurement report sent by the user equipment, where the channel state measurement report includes a downlink transmission signal-to-noise ratio; and the processing module is further configured to obtain the interference intensity based on the downlink transmission signal-to-noise ratio; or the receiving module is configured to: receive a channel sounding reference signal sent by the user equipment, and measure uplink transmission channel quality based on the channel sounding reference signal, to obtain the interference intensity.

The information transmission apparatus provided in the eighth aspect may be specifically implemented as the base station, the receiving module may be implemented as a receiver, the sending module may be implemented as a transmitter, the processing module may be implemented as a processor, and the base station includes a memory that may store program code.

In a specific implementation, the user equipment or the base station may further include a computer program and a memory. The computer program is stored in the memory, and the processor runs the computer program, to perform the foregoing information transmission method of the UE in a low power mode. There is at least one processor, configured to execute an execution instruction, namely, the computer program, stored in the memory. In this way, the user equipment exchanges data with the base station by using a communications interface, to perform the information transmission method provided in each implementation of the foregoing aspects. Optionally, the memory may be further integrated into the processor.

A ninth aspect of this application provides a storage medium, including a readable storage medium and a computer program, where the computer program is used to implement the information transmission method provided in either of the first aspect and the third aspect.

A tenth aspect of this application provides a storage medium, including a readable storage medium and a computer program, where the computer program is used to implement the information transmission method provided in either of the second aspect and the fourth aspect.

An eleventh aspect of this application provides a program product, where the program product includes a computer program (namely, an execution instruction), and the computer program is stored in a readable storage medium. At least one processor of user equipment may read the computer program from the readable storage medium, and the at least one processor executes the computer program, so that the user equipment implements the information transmission method provided in each implementation of the first aspect or the third aspect.

A twelfth aspect of this application provides a program product, where the program product includes a computer program (namely, an execution instruction), and the computer program is stored in a readable storage medium. At least one processor of a base station may read the computer program from the readable storage medium, and the at least one processor executes the computer program, so that the base station implements the information transmission method provided in each implementation of the second aspect or the fourth aspect.

According to the information transmission method and apparatus provided in this application, the base station sends the system information to the user equipment, where the system information includes the first configuration information used to indicate the fixed-downlink time-frequency resource and the fixed-uplink time-frequency resource; and based on the first configuration information, the user equipment obtains the information on the fixed-downlink time-frequency resource or configures the information to be carried on the fixed-uplink time-frequency resource. The base station indicates the fixed uplink and downlink time-frequency resources by using the first configuration information in the system information, but does not indicate the specific type of the unit time-frequency resource. Subsequently, the base station may dynamically configure the type of each unit time-frequency resource in the information transmission process, in other words, support the dynamic change of the minimum unit uplink/downlink time-frequency resource. This avoids a waste of time-frequency resources when the uplink-downlink service ratio does not match the predefined uplink/downlink resource configuration type. The base station may dynamically change the uplink-downlink time-frequency resource ratio based on the service status in the subsequent transmission process, and does not need to use the system information to configure the uplink-downlink time-frequency resource ratio. This ensures a relatively low access delay of the user equipment, implements rapid configuration of a time-frequency resource transmission type, and improves quality of service.

DESCRIPTION OF EMBODIMENTS

Regarding a feature that a service dynamically changes, a full dynamic TDD system or a semi-persistent TDD system is proposed in this solution to match a dynamic change of a service. The full dynamic TDD system means that a base station notifies user equipment of a type of a current scheduling unit by using Radio Resource Control (RRC) signaling and/or system information and downlink control information. The user equipment needs to determine a type of at least one minimum scheduling unit based on the received downlink control information (the user equipment cannot determine all subframe types by using only RRC signaling and system information). The semi-persistent TDD system means that a base station notifies user equipment of a type of a current scheduling unit by using RRC signaling and/or system information. The user equipment determines a type of a scheduling unit based on the received RRC signaling and/or the system information. The full dynamic TDD system may support a dynamic change of an uplink time-frequency resource or a downlink time-frequency resource of a minimum scheduling unit. The semi-persistent TDD system may directly perform different configurations a plurality of times on an uplink time-frequency resource and a downlink time-frequency resource of a minimum scheduling unit. For example, a minimum changeable unit may be a subframe. The minimum scheduling unit is referred to as one subframe in LTE. In a subsequent evolved system such as a 5G system, the minimum scheduling unit may change, for example, a slot. A full dynamic change cannot be at the cost of system access performance. For example, when the user equipment may send uplink service request information at any time, support from the full dynamic TDD system cannot be obtained at the cost of access time.

An information transmission method provided in this application is applied to a base station and user equipment. The base station adds configuration information to system information that is sent in an access process of the user equipment, to dynamically configure an uplink time-frequency resource and a downlink time-frequency resource. The base station used in the technical solutions of this application is a device to connect the user equipment to a wireless network. The base station may include, but is not limited to, an evolved NodeB (eNB), a radio network controller (RNC), a NodeB (NB), a base station controller (BSC), a base transceiver station (BTS), a home evolved NodeB (for example, Home evolved NodeB, or Home NodeB, HNB), a baseband unit (BBU), an access point (AP), or the like.

The user equipment (UE) may also be referred to as a terminal device, and is a device that provides a user with voice and/or data connectivity, such as a handheld device having a wireless connection function, a mobile phone, a vehicular device, a wearable device, a computing device, a mobile station (MS), or another processing device connected to a radio modem.

Figure 1A:
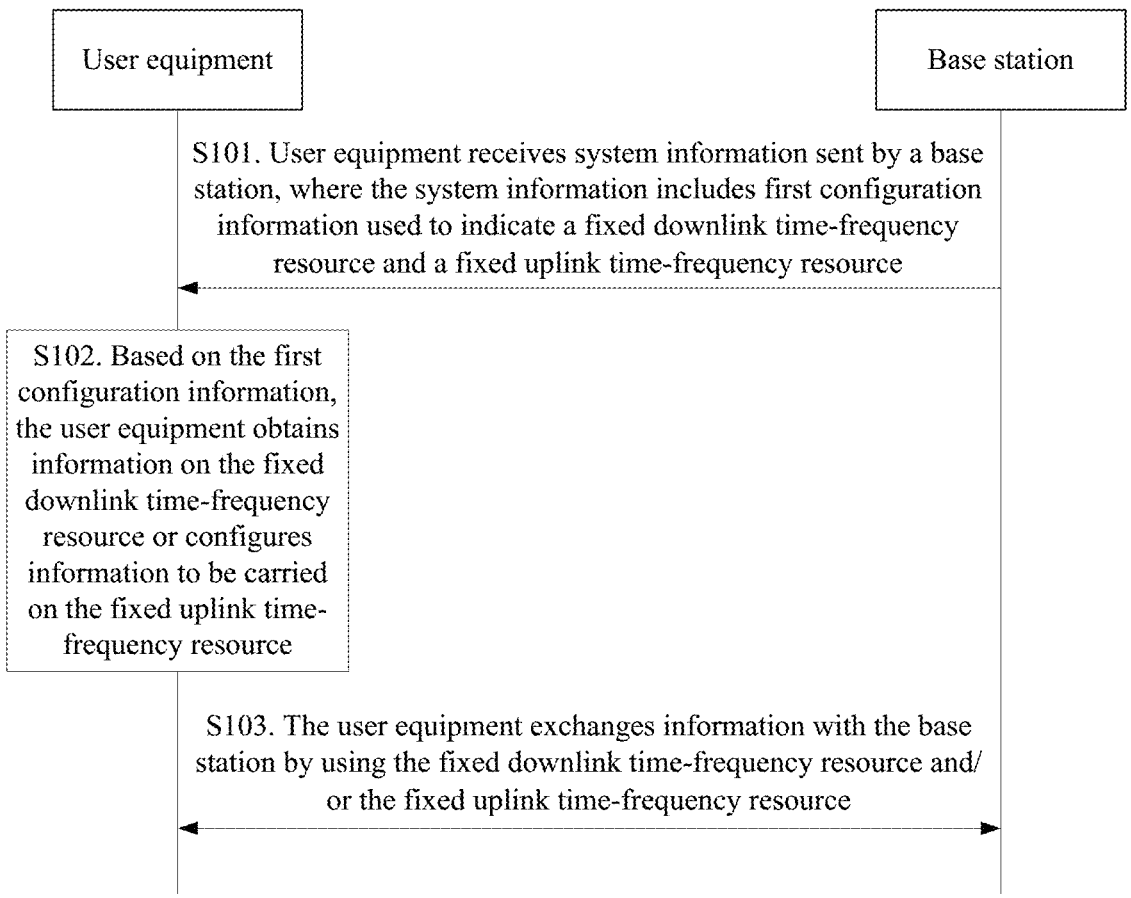
FIG. 1a is a flowchart of a first embodiment of an information transmission method according to this application.

FIG. 1a is a flowchart of a first embodiment of an information transmission method according to this application. As shown in FIG. 1a, the information transmission method is applied between user equipment and a base station. Specific implementation steps are as follows:

S101. The user equipment receives system information sent by the base station, where the system information includes first configuration information used to indicate a fixed-downlink time-frequency resource and a fixed-uplink time-frequency resource.

In this step, the base station obtains the system information including the first configuration information, and sends the system information to the user equipment. The first configuration information indicates the fixed-downlink time-frequency resource and the fixed-uplink time-frequency resource that are allocated to the user equipment. The fixed-uplink time-frequency resource or the fixed-downlink time-frequency resource is one or several OFDM symbols of a unit time-frequency resource, and a quantity of OFDM symbols of the fixed-uplink time-frequency resource or the fixed-downlink time-frequency resource is less than a quantity of OFDM symbols of the unit time-frequency resource. A quantity of OFDM symbols of each unit time-frequency resource is fixed. The unit time-frequency resource may be one or more minimum scheduling units. The first configuration information in this solution limits only fixed one or several OFDM symbols that are dedicatedly used for uplink transmission or downlink transmission, but does not limit a type of each unit time-frequency resource.

For example, in LTE, a unit time-frequency resource is a subframe, and a minimum scheduling unit is also a subframe. A fixed quantity of OFDM symbols means that each subframe includes 14 OFDM symbols. The fixed-uplink time-frequency resource or the fixed-downlink time-frequency resource indicated by the first configuration information may be n OFDM symbols of a subframe, where n is a positive integer less than or equal to 12.

A subframe is used as an example. First configuration information received by a user indicates that the first two symbols of the subframe are used for uplink transmission and other symbols are not limited. In this case, a type of the subframe is not determined. The subframe may be an uplink subframe, a primary uplink subframe, or a primary downlink subframe, and may be dynamically configured based on a requirement subsequently.

It can be learned from the above that the first configuration information is further used to indicate that the type of each unit time-frequency resource is not limited. The first configuration information indicates that the type of each unit time-frequency resource is not limited. This means that the first configuration information does not indicate an uplink/downlink type of the unit time-frequency resource. The uplink/downlink type may include an uplink subframe, a downlink subframe, a primary uplink subframe, and a primary downlink subframe. In other words, it is predefined for each uplink/downlink type that each OFDM symbol is an uplink symbol, a downlink symbol, or a guard period (GP) symbol.

In addition, the type of the unit time-frequency resource includes: the unit time-frequency resource used to send uplink information, the unit time-frequency resource used to receive downlink information, or the unit time-frequency resource used to send uplink information and receive downlink information (equivalent to primary uplink or primary downlink).

S102. Based on the first configuration information, the user equipment obtains information on the fixed-downlink time-frequency resource or configures information to be carried on the fixed-uplink time-frequency resource.

In this step, after receiving the system information including the first configuration information, the user equipment needs to perform downlink information transmission or uplink information transmission based on the fixed-downlink time-frequency resource and the fixed-uplink time-frequency resource in the system information. From a perspective of the user equipment, if the base station sends information (which may be data or a signal) on the fixed-downlink time-frequency resource, the user equipment needs to perform detection on the fixed-downlink time-frequency resource to obtain the information; and if the user equipment needs to send information (which may also be data or a signal) to the base station, the user equipment may perform processing such as modulation and coding on the to-be-sent information, and configure the information on the fixed-uplink time-frequency resource for sending.

S103. The user equipment exchanges information with the base station by using a fixed-downlink time-frequency resource and/or a fixed-uplink time-frequency resource.

In this solution, S103 is an optional step. From a perspective of the user equipment, the user equipment sends the information to the base station based on a fixed-uplink time-frequency resource; and/or the user equipment receives, based on the fixed-downlink time-frequency resource, the information sent by the base station. From a perspective of the base station, the base station receives the information sent by the user equipment on the fixed-uplink time-frequency resource; and/or the base station sends the information to the user equipment on a fixed-downlink time-frequency resource. In other words, the base station and the user equipment exchange information.

In the foregoing solution, a radio frame is used as an example. The system information includes first configuration information indicating a fixed-uplink/downlink time-frequency resource of some subframes of the radio frame. The fixed-uplink time-frequency resource or the fixed-downlink time-frequency resource occupies at least one OFDM symbol in time domain (the fixed-uplink time-frequency resource and the fixed-downlink time-frequency resource are located at different locations in the subframes).

Figure 1B:
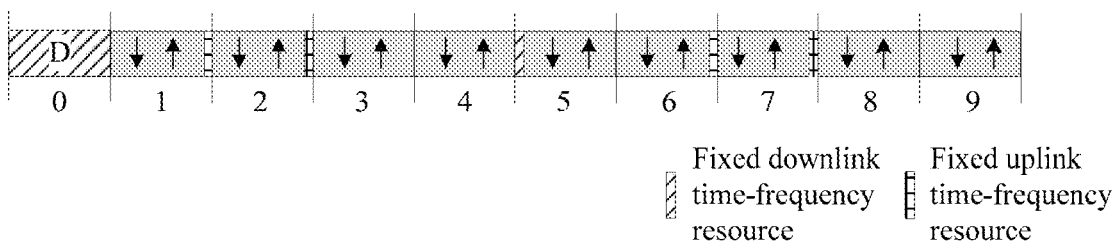
FIG. 1b is a schematic diagram of a fixed-uplink time-frequency resource and a fixed-downlink time-frequency resource in an information transmission method according to this application.

Such a manner in which only one or several OFDM symbols are occupied ensures that a transmission direction (uplink or downlink) of the subframes in which the fixed-time-frequency resources are located can dynamically change, and a waiting delay of an uplink data sending scheduling request is reduced by predefining the uplink time-frequency resource. For example, FIG. 1b is a schematic diagram of a fixed-uplink time-frequency resource and a fixed-downlink time-frequency resource in an information transmission method according to this application. As shown in FIG. 1b, a radio frame is used as an example, and the radio frame includes 10 subframes 0 to 9. After fixed configuration is performed by using the first configuration information, a fixed-uplink time-frequency resource and a fixed-downlink time-frequency resource in the radio frame may be shown in the figure. In addition to the fixed-time-frequency resources, other resources may be indicated based on downlink control information. In the figure, in the subframes 1 to 9, in addition to subframes that have been indicated as the fixed-downlink time-frequency resource (a subframe 5) and the fixed-uplink time-frequency resources (subframes 1, 2, 6, and 7), other time domain resources may be used to transmit uplink information (an up arrow) or may be used to transmit downlink information (a down arrow), and a specific subframe type may be indicated in the subsequent downlink control information.

In FIG. 1b, the fixed-downlink time-frequency resource is the first one or several symbols of a subframe, and the fixed-uplink time-frequency resource is the last one or several symbols of a subframe.

In an optional implementation, the fixed-downlink time-frequency resource is at least one OFDM symbol that starts from a start location of a unit time-frequency resource in time domain, and the fixed-uplink time-frequency resource is at least one OFDM symbol that ends at an end location of a unit time-frequency resource in time domain. A subframe is used as an example. A meaning of the implementation is that the first one or several symbols of the subframe may be configured as the fixed-downlink time-frequency resource and that the last one or several symbols of the subframe may be configured as the fixed-uplink time-frequency resource.

For example, currently, a radio frame includes 10 subframes (subframe numbers are 0 to 9), and each subframe includes a plurality of OFDM symbols. The first configuration information may indicate that the subframe 0 includes the fixed-downlink time-frequency resource and the subframe 5 includes the fixed-uplink time-frequency resource. Specifically, the first configuration information may indicate that a symbol configured as the fixed-downlink time-frequency resource in the subframe 0 is the first OFDM symbol. In other words, for the subframe 0, only the first symbol is a fixed-resource used for downlink transmission, and other symbols are not limited. A type of the subframe 0 may be a downlink subframe, a primary uplink subframe, or a primary downlink subframe. It may be indicated that a symbol configured as the fixed-uplink time-frequency resource in the subframe 5 is the last OFDM symbol. In other words, for the subframe 5, only the last symbol is a fixed resource used for uplink transmission, and other symbols are not limited. A type of the subframe 5 may be an uplink subframe, a primary uplink subframe, or a primary downlink subframe.

Figures 2A, 2B:
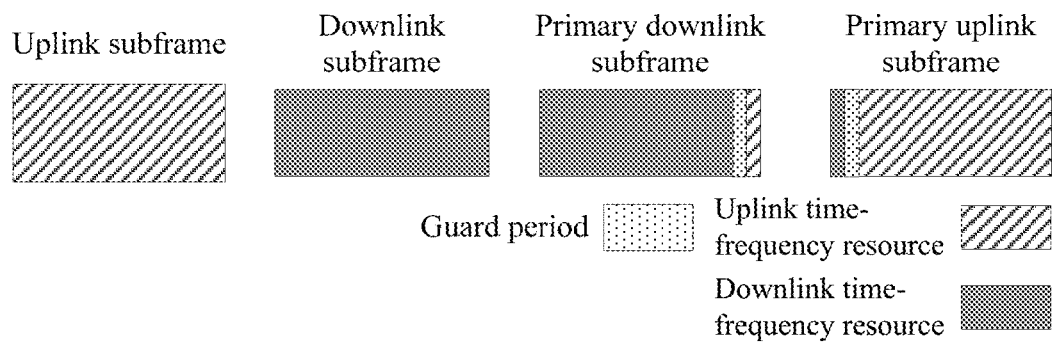
FIG. 2a is schematic diagrams of four subframe types.
FIG. 2b is a schematic diagram of a subframe type corresponding to a subframe in which a fixed-uplink time-frequency resource/fixed-downlink time-frequency resource is located according to this application.

FIG. 2a is schematic diagrams of four subframe types. As shown in FIG. 2a, in a wireless access system, the following several subframe types are included: an uplink subframe (that is, an uplink subframe), a downlink subframe (that is, a downlink subframe), and hybrid subframes, namely, a primary uplink subframe and a primary downlink subframe.

FIG. 2b is a schematic diagram of a subframe type corresponding to a subframe in which a fixed-uplink time-frequency resource/fixed-downlink time-frequency resource is located according to this application. As shown in FIG. 2b, there is at least one fixed OFDM symbol for downlink transmission at a start location of a subframe. The subframe may still be one of a downlink subframe, a primary downlink subframe, or a primary uplink subframe. Because the fixed-uplink time-frequency resource is at least one OFDM symbol at an end of a subframe including the fixed-uplink time-frequency resource in time domain, the subframe may still be one of an uplink subframe, a primary downlink subframe, or a primary uplink subframe.

According to the information transmission method provided in this embodiment, the base station indicates the fixed-uplink and downlink time-frequency resources by using the first configuration information in the system information, but does not indicate the specific type of the unit time-frequency resource. Subsequently, the base station may dynamically configure the type of each unit time-frequency resource in an information transmission process, in other words, support a dynamic change of a minimum unit uplink/downlink time-frequency resource. This avoids a problem of a waste of time-frequency resources caused when an uplink-downlink service ratio does not match a predefined uplink/downlink resource configuration type. In addition, the base station may dynamically change an uplink-downlink time-frequency resource ratio based on a service status, and does not need to use the system information to configure the uplink-downlink time-frequency resource ratio. This ensures a relatively low access delay of the user equipment, implements rapid configuration of a time-frequency resource transmission type, and effectively improves quality of service.

Figure 3:
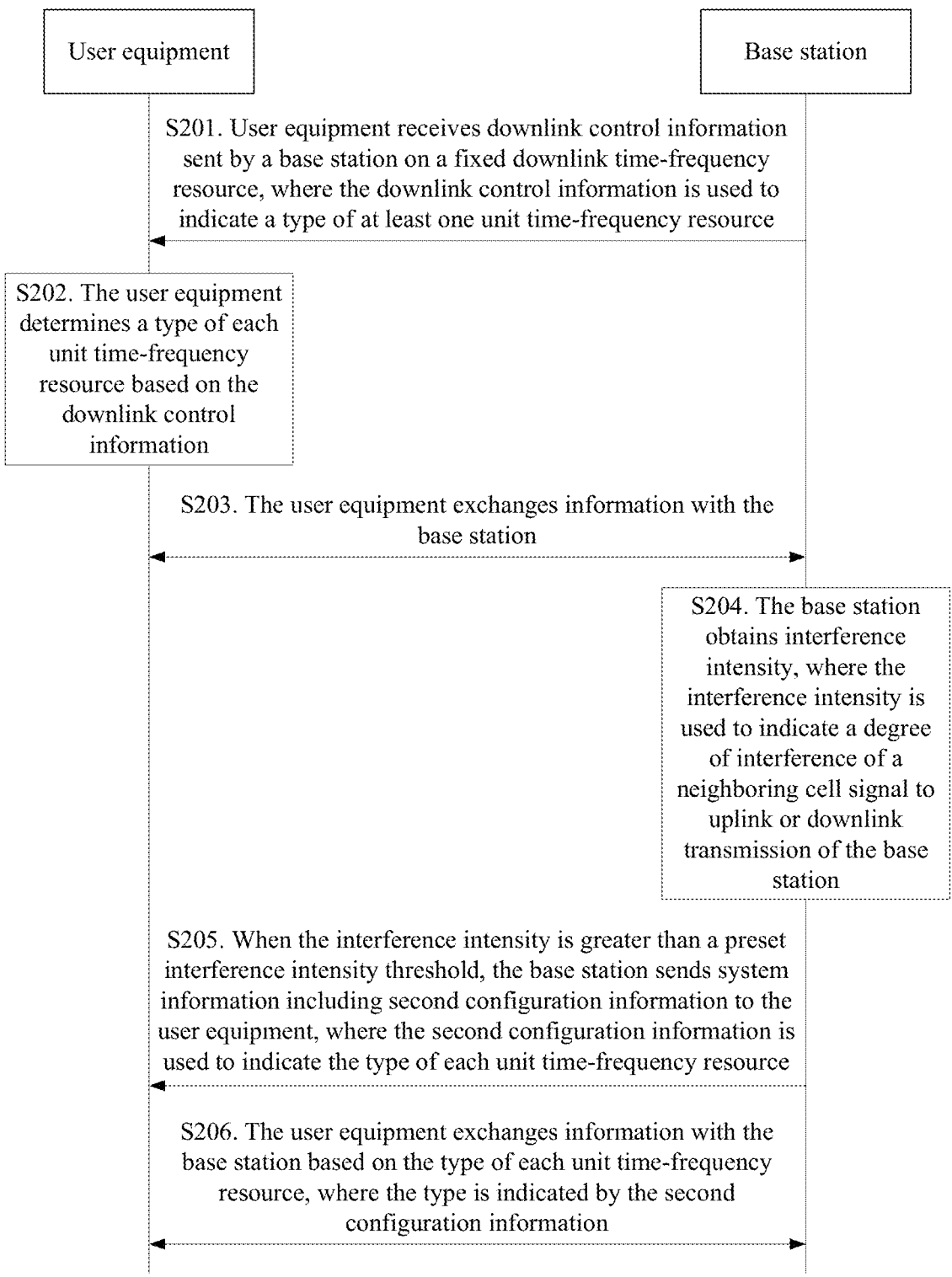
FIG. 3 is a flowchart of a second embodiment of an information transmission method according to this application.

FIG. 3 is a flowchart of a second embodiment of an information transmission method according to this application. Based on the foregoing first embodiment, as shown in FIG. 3, the information transmission method further includes the following steps.

S201. The user equipment receives downlink control information sent by the base station on the fixed-downlink time-frequency resource, where the downlink control information is used to indicate a type of at least one unit time-frequency resource.

In this step, after indicating the fixed-uplink time-frequency resource and the fixed-downlink time-frequency resource by using the system information, the base station may indicate the type of the unit time-frequency resource by using the downlink control information.

S202. The user equipment determines a type of each unit time-frequency resource based on the downlink control information.

S203. The user equipment exchanges information with the base station.

A subframe is used as an example. After sending the system information, the base station sends the downlink control information at a location of at least the fixed-downlink time-frequency resource, to indicate a type of a subframe in which the fixed-downlink time-frequency resource is located or a type of another subframe, or indicate subframe types of all subframes.

In the solution, a subframe in which the downlink control information is located includes at least a subframe used to send the system information. Specifically, a subframe type of the at least one subframe may be indicated by using two bits of information, as shown in Table 2.

TABLE 2

Correspondence table between subframe indication information and a subframe type

| Bit value | 11 | 00 | 01 | 10 |
|---|---|---|---|---|
| Subframe type | downlink subframe | uplink subframe | Primary uplink subframe | Primary downlink subframe |

As shown in the foregoing table, when the downlink control information is used to indicate a subframe type of a current subframe, two bits of information need to be added to the downlink control information. If the downlink control information indicates subframe types of all subframes (10) of a radio frame, a sequence with a length of 20 bits is required, and every two bits are used to indicate a subframe type of one subframe.

In addition, the downlink control information may further include indication information used to indicate a location of a guard period and a length of the guard period in a primary uplink/downlink subframe. For example, three bits of information are further introduced, to indicate a quantity of OFDM symbols between a start location of the guard period in time domain and a nearest subframe boundary. Additional two bits of information are configured, to indicate a quantity of OFDM symbols occupied by the guard period.

After the type of the unit time-frequency resource is determined, the base station exchanges information with the user equipment based on the type of the at least one unit time-frequency resource.

S204. The base station obtains interference intensity, where the interference intensity is used to indicate a degree of interference of a neighboring cell signal to uplink or downlink transmission of the base station.

In the information transmission process, the base station needs to obtain the interference of the neighboring cell signal in the uplink/downlink transmission of the base station in real time, and determine, by using the interference intensity, whether to continue to use a current full dynamic TDD manner or another manner. Specifically, there are at least the following several manners for the base station to obtain the interference intensity:

In a first manner, the user equipment sends a channel state measurement report to the base station; the base station receives the channel state measurement report sent by the user equipment, where the channel state measurement report includes a signal-to-noise ratio of a downlink signal; and the base station obtains the interference intensity based on the signal-to-noise ratio of the downlink signal.

A meaning is that the base station receives, by triggering or configuring channel measurement of the user equipment in a current cell, the channel state measurement report sent by the user equipment, and then obtains the interference intensity based on the channel measurement report.

In a second manner, the base station measures interference signal intensity of a neighboring cell at a predefined time-frequency resource location, and uses the intensity as the interference intensity. A meaning is that the base station measures, at the predefined time-frequency resource location, signal strength of a reference signal sent from another cell, and uses the signal strength as the interference intensity.

In a third manner, the base station receives a channel sounding reference signal sent by the user equipment, and measures uplink transmission channel quality based on the channel sounding reference signal, to obtain the interference intensity.

A meaning is that the base station obtains, by sending the downlink control information and higher layer signaling, the channel sounding reference signal sent by the user equipment, and measures uplink channel quality of a current cell based on the received channel sounding reference signal, to obtain the interference intensity.

S205. When the interference intensity is greater than a preset interference intensity threshold, the base station sends system information including second configuration information to the user equipment, where the second configuration information is used to indicate a type of each unit time-frequency resource.

In this step, the base station compares the obtained interference intensity with the preset interference intensity threshold. If the interference intensity is greater than the threshold in the dynamic TDD system manner, the base station determines that a semi-persistent TDD system manner needs to be used, and sends the system information including the second configuration information to the user equipment. The second configuration information is used to indicate a type of each unit time-frequency resource, and the type of the unit time-frequency resource includes: the unit time-frequency resource used to send uplink information, the unit time-frequency resource used to receive downlink information, or the unit time-frequency resource used to send uplink information and receive downlink information.

S206. The user equipment exchanges information with the base station based on the type of each unit time-frequency resource, where the type is indicated by the second configuration information.

In this step, after the type of each unit time-frequency resource is determined, the base station exchanges information with the user equipment based on the type of the unit time-frequency resource, including transmission of a signal and data.

The foregoing steps S204 to S206 are optional execution steps. After a current system is configured as a dynamic TDD system, it is not required that system type switching be performed based on the interference intensity.

Further, optionally, when the interference intensity is less than the threshold, the base station may indicate the fixed-uplink time-frequency resource and the fixed-downlink time-frequency resource of the user equipment by using the system information including the first configuration information, and switch the current system to the dynamic TDD system. In the dynamic TDD system, a subframe type of each subframe is not limited in the system information. The user equipment may determine a subframe type of a current subframe based on subsequently received indication information or control information.

In any one of the foregoing embodiments, a specific manner used by the user equipment to detect the downlink control information includes: before receiving the system information, receiving, by the user equipment, the downlink control information for scheduling the system information. The downlink control information includes the subframe types of all the subframes of the radio frame. This manner avoids that within a long time after receiving the system information, the user equipment receives no downlink control information indicating a subframe type, thereby reducing a delay of the user equipment for accessing the system.

Optionally, after the user equipment receives the system information, the method further includes: sending, by the user equipment, uplink scheduling request information to the base station. In other words, when the user equipment needs to send uplink data, the user equipment needs to send uplink request information at a resource location on the fixed-uplink time-frequency resource.

The information transmission method provided in this solution not only avoids a waste of time-frequency resources caused when the uplink-downlink service ratio does not match the predefined uplink/downlink resource configuration type, but also implements dynamic adjustment of an uplink/downlink time-frequency resource configuration ratio, thereby reducing a processing delay, and ensuring flexibility of the dynamic TDD system. In addition, based on flexible switching between the dynamic TDD system and the semi-persistent TDD system, the semi-persistent TDD system is used when system load is relatively high or interference is relatively strong, thereby effectively ensuring system performance.

Figure 4A:
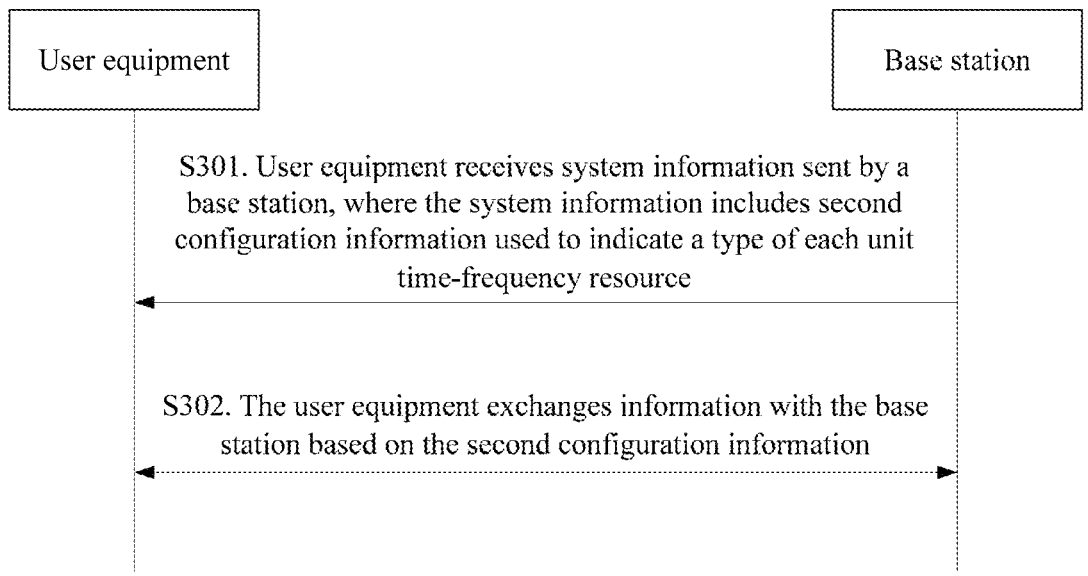
FIG. 4a is a flowchart of a third embodiment of an information transmission method according to this application.

FIG. 4a is a flowchart of a third embodiment of an information transmission method according to this application. As shown in FIG. 4a, the information transmission method for a semi-persistent TDD system is further provided. Specific implementation steps are as follows:

S301. User equipment receives system information sent by a base station, where the system information includes second configuration information used to indicate a type of each unit time-frequency resource.

In this step, the type of the unit time-frequency resource includes: the unit time-frequency resource used to send uplink information, the unit time-frequency resource used to receive downlink information, or the unit time-frequency resource used to send uplink information and receive downlink information. The base station indicates the type of each unit time-frequency resource by using the second configuration information in the system information, in other words, determines an uplink-downlink configuration manner for the unit time-frequency resource.

A radio frame is used as an example. For TDD system with a fixed uplink/downlink configuration, the system information further includes the second configuration information indicating different uplink/downlink configurations, namely, subframe types. For example, different configuration types may be indicated according to the following Table 3:

TABLE 3

TDD with a fixed uplink/downlink configuration (including four subframe types)

| Uplink/downlink configuration type | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U* | U* | U* | D | S | U* | U* | U* |
| 1 | D | S | U* | U* | D* | D | S | U* | U* | D* |
| 2 | D | S | U* | D* | D* | D | S | U* | D* | D* |
| 3 | D | S | U* | U* | U* | D | D* | D* | D* | D* |
| 4 | D | S | U* | U* | D* | D | D* | D* | D* | D* |
| 5 | D | S | U* | D* | D* | D | D* | D* | D* | D* |
| 6 | D | S | U* | U* | U* | D | S | U* | U* | D* |

{U*} and {D*} in the configuration type represent subframe types that need to be further indicated, and {D} and {S} represent subframe types in a configuration manner as described in the BACKGROUND.

For a configuration type, for example, a configuration 2 needs to include indication information used to indicate {U*} and {D*} subframe types. The indication information may be one bit sequence {1 0 1 0 0 1}. For a {U*} subframe, {1} represents that a current subframe is a primary uplink subframe, and {0} represents that the current subframe is an uplink subframe. For a {D*} subframe, {1} represents that a current subframe is a primary downlink subframe, and {0} represents that the current subframe is a downlink subframe.

In addition, the system information further includes information indicating a location and a length of a guard period in a primary uplink/downlink subframe. For example, five bits of information are introduced, with three bits of information being used to indicate a quantity of OFDM symbols between a start location of the guard period in time domain and a nearest subframe boundary, and remaining two bits of information being used to indicate a quantity of OFDM symbols occupied by the guard period.

In addition, configuration information of the guard period may be used to configure the primary uplink subframe and/or the primary downlink subframe. Specifically, the system information includes only configuration information of the guard period in the primary uplink subframe, and configuration information of the guard period in the primary downlink subframe is symmetrically designed by referencing to the location of the guard period in the primary uplink subframe. Alternatively, the system information includes configuration information of the guard periods in the primary uplink subframe and the primary downlink subframe, each piece of configuration information occupies five bits, and a total of 10 bits are used to configure the locations of the guard periods of the two subframes.

S302. The user equipment exchanges information with the base station based on the second configuration information.

After indicating the type of the unit time-frequency resource is completed, uplink-downlink data and information may be transmitted between the base station and the user equipment by using the unit time-frequency resource of a determined type.

In this solution, a subframe is used as an example. The base station configures a subframe type of each subframe of a current system in the system information. The configuration type is a result determined after negotiation between different base stations and/or different operators. Information is transmitted between the different base stations by using an X2 interface. The base station determines all subframe types for the current system based on a configuration status of a neighboring cell.

Figure 4B:
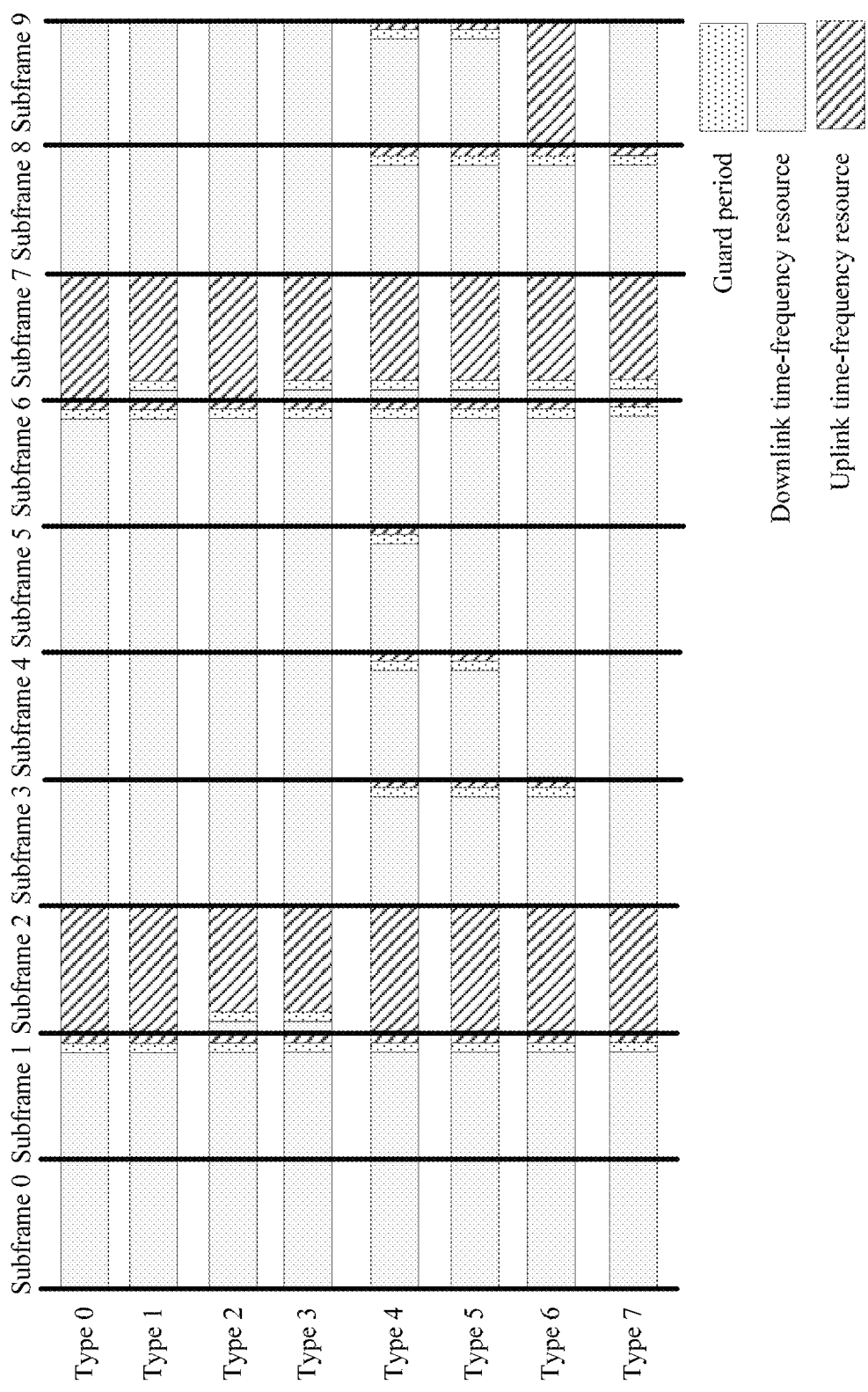
FIG. 4b is a schematic diagram of a subframe type in an information transmission method according to this application.

FIG. 4b is a schematic diagram of a subframe type in an information transmission method according to this application. As shown in FIG. 4b, the type of each unit time-frequency resource indicated by the second configuration information is used as a predefined uplink-downlink time-frequency resource configuration. The predefined configuration may be any configuration manner in FIG. 4b (likewise, in FIG. 4b, a fixed-downlink time-frequency resource is the first one or several symbols of a subframe, and a fixed-uplink time-frequency resource is the last one or several symbols of a subframe). In a subsequent information transmission process, the base station may indicate the type of each unit time-frequency resource by using RRC signaling. For example, a radio frame has 10 subframes, and there are a plurality of uplink-downlink configuration combinations, which may be greater than or equal to seven combination types in a current LTE system.

If the current system coexists with the Long Term Evolution (LTE) system, a configuration type of each subframe is one of the seven configuration types (this solution is not limited to seven types shown in Table 4) in the LTE system. The seven configuration types in LTE are shown in Table 4.

TABLE 4

TDD with a fixed uplink/downlink configuration

| Uplink/downlink configuration type | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D represents a downlink subframe, S represents a special subframe, and U represents an uplink subframe.

According to the information transmission method provided in this embodiment, the base station may configure the system as the semi-persistent TDD system by using the system information including the second configuration information. This facilitates interference coordination between the different base stations.

Figure 5:
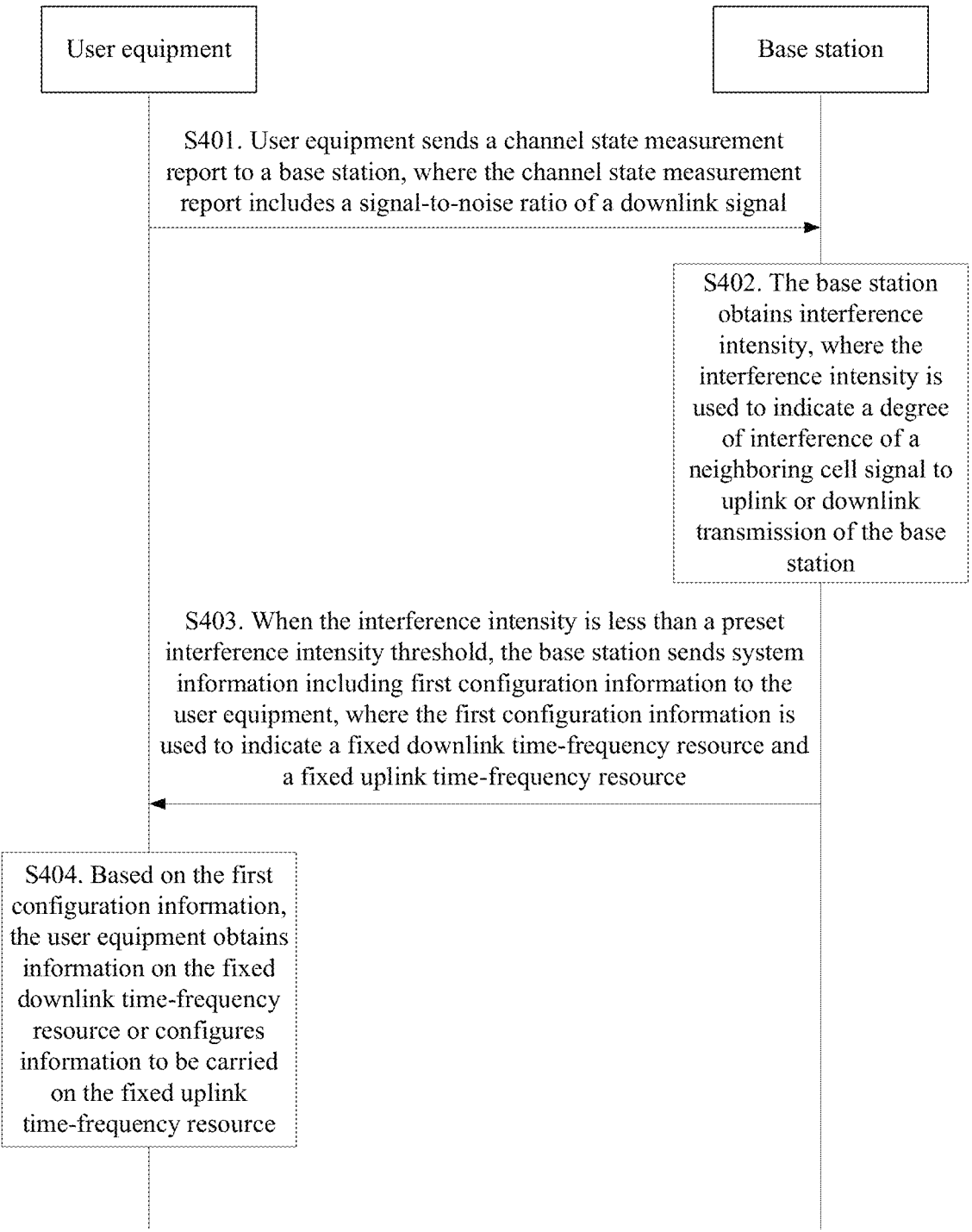
FIG. 5 is a flowchart of a fourth embodiment of an information transmission method according to this application.

FIG. 5 is a flowchart of a fourth embodiment of an information transmission method according to this application. As shown in FIG. 5, after a system is configured as a semi-persistent TDD system in the third embodiment, the information transmission method further includes the following steps.

S401. User equipment sends a channel state measurement report to a base station, where the channel state measurement report includes a signal-to-noise ratio of a downlink signal.

S402. The base station obtains interference intensity, where the interference intensity is used to indicate a degree of interference of a neighboring cell signal to uplink or downlink transmission of the base station.

In this technical solution, in an information transmission process, the base station needs to obtain the interference of the neighboring cell signal to the uplink/downlink transmission of the base station in real time, and determine, based on the interference intensity, whether to continue to use a current semi-persistent TDD manner or another manner. Specifically, there are at least the following several manners for the base station to obtain the interference intensity:

In a first manner, the user equipment sends a channel state measurement report to the base station; the base station receives the channel state measurement report sent by the user equipment, where the channel state measurement report includes the signal-to-noise ratio of the downlink signal; and the base station obtains the interference intensity based on the signal-to-noise ratio of the downlink signal.

A meaning is that the base station receives, by triggering or configuring channel measurement of the user equipment in a current cell, the channel state measurement report sent by the user equipment, and then obtains the interference intensity based on the channel measurement report.

In a second manner, the base station measures interference signal intensity of a neighboring cell at a predefined time-frequency resource location, and uses the intensity as the interference intensity. A meaning is that the base station measures, at the predefined time-frequency resource location, signal strength of a reference signal sent from another cell, and uses the signal strength as the interference intensity.

In a third manner, the base station receives a channel sounding reference signal sent by the user equipment, and measures uplink transmission channel quality based on the channel sounding reference signal, to obtain the interference intensity.

A meaning is that the base station obtains, by sending downlink control information and higher layer signaling, the channel sounding reference signal sent by the user equipment, and measures uplink channel quality of a current cell based on the received channel sounding reference signal, to obtain the interference intensity.

S403. When the interference intensity is less than a preset interference intensity threshold, the base station sends system information including first configuration information to the user equipment, where the first configuration information is used to indicate a fixed-downlink time-frequency resource and a fixed-uplink time-frequency resource.

In this step, the base station compares the obtained interference intensity with the preset interference intensity threshold. If the interference intensity is less than the threshold in the dynamic TDD system manner, the base station determines that the full dynamic TDD system manner needs to be used, in other words, configures a current serving cell as a dynamic TDD system. A specific implementation is indicating the fixed-uplink time-frequency resource and the fixed-downlink time-frequency resource by using the system information including the first configuration information. In the dynamic TDD system, a type of each unit time-frequency resource is not limited in the system information. The user equipment determines a type of a current unit time-frequency resource (for example, a subframe) based on received indication information or downlink control information.

S404. Based on the first configuration information, the user equipment obtains information on the fixed-downlink time-frequency resource or configures information to be carried on the fixed-uplink time-frequency resource.

After receiving the system information including the first configuration information, the user equipment needs to perform downlink information transmission or uplink information transmission based on the fixed-downlink time-frequency resource and the fixed-uplink time-frequency resource in the system information. From a perspective of the user equipment, if the base station sends information (which may be data or a signal) on the fixed-downlink time-frequency resource, the user equipment needs to perform detection on the fixed-downlink time-frequency resource to obtain the information; and if the user equipment needs to send information (which may also be data or a signal) to the base station, the user equipment may perform processing such as modulation and coding on the to-be-sent information, and configure the information on the fixed-uplink time-frequency resource for sending.

After the current system is switched to the dynamic TDD system, for specific manners for determining a type of a unit time-frequency resource and for transmitting information, refer to the foregoing embodiments. Likewise, this solution in which the base station switches the semi-persistent TDD system to the dynamic TDD system based on the obtained interference intensity of the signal is also an optional solution, and switching in a process of running the semi-persistent TDD system is not mandatory.

In addition, in the dynamic TDD system, when the interference intensity is excessively high, the system may reuse a predefined uplink-downlink time-frequency resource configuration.

This solution ensures flexibility of the dynamic TDD system. In addition, based on flexible switching between the dynamic TDD system and the semi-persistent TDD system, the semi-persistent TDD system is used when system load is relatively high or interference is relatively strong, and the dynamic TDD system is used when the interference is relatively weak or the load is relatively low. This effectively ensures system performance.

Based on any one of the foregoing solutions, the system information may further include a field, used to indicate that the current system is the dynamic TDD system or the semi-persistent TDD system. Specifically, the base station adds one bit of information to the system information. The one bit of information is used to indicate that the system is the dynamic TDD system or a TDD system with a fixed-uplink-downlink configuration.

Switching may be performed between the dynamic TDD system and the semi-persistent TDD system that are provided in this application. Switching based on the interference intensity in the foregoing embodiment is merely one implementation. Alternatively, switching may be performed based on a parameter such as service load of the system and a quantity of served users. For example, when the quantity of served users or the service load of the system is less than a preset value, the system is switched from the semi-persistent TDD system to the dynamic TDD system; when the quantity of served users or the service load of the system is not less than a preset value, the semi-persistent TDD system may be switched back to. This is not limited in this application.

Figure 6:
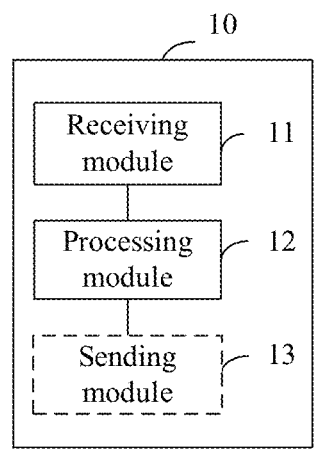
FIG. 6 is a schematic structural diagram of a first embodiment of an information transmission apparatus according to this application.

FIG. 6 is a schematic structural diagram of a first embodiment of an information transmission apparatus according to this application. As shown in FIG. 6, the information transmission apparatus 10 includes:

a receiving module 11, configured to receive system information sent by a base station, where the system information includes first configuration information used to indicate a fixed-downlink time-frequency resource and a fixed-uplink time-frequency resource; and a processing module 12, configured to: based on the first configuration information, obtain information on the fixed-downlink time-frequency resource or configure information to be carried on the fixed-uplink time-frequency resource.

The information transmission apparatus provided in this embodiment is configured to perform the technical solution on the user equipment side in any one of the foregoing technical solutions. Implementation principles and technical effects thereof are similar. Therefore, details are not described herein again.

Based on the foregoing solution, optionally, the first configuration information received by the receiving module 11 is further used to indicate that a type of each unit time-frequency resource is not limited. The unit time-frequency resource includes a fixed quantity of OFDM symbols, and the type includes the unit time-frequency resource used to send uplink information, the unit time-frequency resource used to receive downlink information, or the unit time-frequency resource used to send uplink information and receive downlink information.

Optionally, based on the foregoing solution, the information transmission apparatus 10 further includes a sending module 13, where the sending module 13 is configured to send information to the base station based on the fixed-uplink time-frequency resource; and/or the receiving module 11 is further configured to receive, based on the fixed-downlink time-frequency resource, information sent by the base station.

Optionally, the receiving module 11 is further configured to receive downlink control information sent by the base station on the fixed-downlink time-frequency resource. The downlink control information is used to indicate a type of at least one unit time-frequency resource.

The processing module 12 is further configured to determine the type of each unit time-frequency resource based on the downlink control information.

The unit time-frequency resource includes a fixed quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the fixed-downlink time-frequency resource indicated by the first configuration information received by the receiving module 11 is at least one OFDM symbol that starts from a start location of a unit time-frequency resource in time domain, and the fixed-uplink time-frequency resource is at least one OFDM symbol that ends at an end location of a unit time-frequency resource in time domain.

Optionally, the receiving module 11 is further configured to receive system information that is sent by the base station and that includes second configuration information. The second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the sending module 13 is further configured to send a channel state measurement report to the base station. The channel state measurement report includes a signal-to-noise ratio of a downlink signal.

The information transmission apparatus provided in this embodiment is configured to perform the technical solution on the user equipment side in any one of the foregoing technical solutions. Implementation principles and technical effects thereof are similar. Therefore, details are not described herein again.

Figure 7:
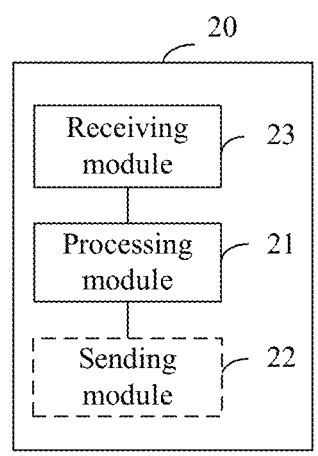
FIG. 7 is a schematic structural diagram of a second embodiment of an information transmission apparatus according to this application.

FIG. 7 is a schematic structural diagram of a second embodiment of an information transmission apparatus according to this application. As shown in FIG. 7, the information transmission apparatus 20 includes:

a processing module 21, configured to obtain system information, where the system information includes first configuration information used to indicate a fixed-downlink time-frequency resource and a fixed-uplink time-frequency resource; and a sending module 22, configured to send the system information to user equipment, so that based on the first configuration information, the user equipment obtains information on the fixed-downlink time-frequency resource or configures information to be carried on the fixed-uplink time-frequency resource.

Optionally, the first configuration information obtained by the processing module 21 is further used to indicate that a type of each unit time-frequency resource is not limited. The unit time-frequency resource includes a fixed quantity of orthogonal frequency division multiplexing OFDM symbols, and the type includes the unit time-frequency resource used to send uplink information, the unit time-frequency resource used to receive downlink information, or the unit time-frequency resource used to send uplink information and receive downlink information.

The information transmission apparatus provided in this embodiment is configured to perform the technical solution on the base station side in any one of the foregoing technical solutions. Implementation principles and technical effects thereof are similar. Therefore, details are not described herein again.

Further, the information transmission apparatus 20 further includes a receiving module 23, where the receiving module 23 is configured to receive information sent by the user equipment on the fixed-uplink time-frequency resource; and/or the sending module 22 is further configured to send information to the user equipment on the fixed-downlink time-frequency resource.

Optionally, the sending module 22 is further configured to send downlink control information to the user equipment on the fixed-downlink time-frequency resource, so that the user equipment determines a type of at least one unit time-frequency resource based on the downlink control information. The downlink control information is used to indicate the type of the at least one unit time-frequency resource, the unit time-frequency resource includes the fixed quantity of OFDM symbols, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the fixed-downlink time-frequency resource sent by the sending module 22 is at least one OFDM symbol that starts from a start location of a unit time-frequency resource in time domain, and the fixed-uplink time-frequency resource is at least one OFDM symbol that ends at an end location of a unit time-frequency resource in time domain.

Optionally, the processing module 21 is further configured to obtain interference intensity. The interference intensity is used to indicate a degree of interference of a neighboring cell signal to uplink or downlink transmission of a base station.

When the processing module 21 determines that the interference intensity is greater than a preset interference intensity threshold, the sending module 22 is further configured to send system information including second configuration information to the user equipment. The second configuration information is used to indicate the type of each unit time-frequency resource, and the type of the unit time-frequency resource includes: the unit time-frequency resource used to send the uplink information, the unit time-frequency resource used to receive the downlink information, or the unit time-frequency resource used to send the uplink information and receive the downlink information.

Optionally, the processing module 21 is specifically configured to: measure interference signal intensity of a neighboring cell at a predefined time-frequency resource location, and use the intensity as the interference intensity; or the receiving module 23 is further configured to receive a channel state measurement report sent by the user equipment, where the channel state measurement report includes a signal-to-noise ratio of a downlink signal; and the processing module 21 is further configured to obtain the interference intensity based on the signal-to-noise ratio of the downlink signal; or the receiving module 23 is further configured to: receive a channel sounding reference signal sent by the user equipment, and measure uplink transmission channel quality based on the channel sounding reference signal, to obtain the interference intensity.

The information transmission apparatus provided in this embodiment is configured to perform the technical solution on the base station side in any one of the foregoing technical solutions. Implementation principles and technical effects thereof are similar. Therefore, details are not described herein again.

Figure 8:
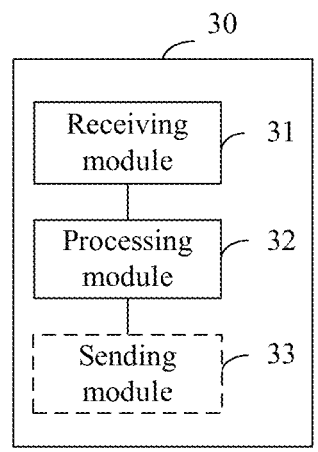
FIG. 8 is a schematic structural diagram of a third embodiment of an information transmission apparatus according to this application.

FIG. 8 is a schematic structural diagram of a third embodiment of an information transmission apparatus according to this application. As shown in FIG. 8, the information transmission apparatus 30 includes:

a receiving module 31, configured to receive system information sent by a base station, where the system information includes second configuration information used to indicate a type of each unit time-frequency resource, the unit time-frequency resource includes a fixed quantity of orthogonal frequency division multiplexing OFDM symbols, and the type of the unit time-frequency resource includes: the unit time-frequency resource used to send uplink information, the unit time-frequency resource used to receive downlink information, or the unit time-frequency resource used to send uplink information and receive downlink information; and a processing module 32, configured to control the information transmission apparatus to exchange information with the base station based on the second configuration information.

Optionally, the receiving module 31 is further configured to receive system information that is sent by the base station and that includes first configuration information. The first configuration information is used to indicate a fixed-downlink time-frequency resource and a fixed-uplink time-frequency resource.

The processing module 32 is further configured to: based on the first configuration information, obtain information on the fixed-downlink time-frequency resource or configure information to be carried on the fixed-uplink time-frequency resource.

The information transmission apparatus provided in this embodiment is configured to perform the technical solution on the user equipment side in any one of the foregoing technical solutions. Implementation principles and technical effects thereof are similar. Therefore, details are not described herein again.

Further, the information transmission apparatus 30 further includes:

a sending module 33, configured to send a channel state measurement report to the base station, where the channel state measurement report includes a signal-to-noise ratio of a downlink signal.

The information transmission apparatus provided in this embodiment is configured to perform the technical solution on the user equipment side in any one of the foregoing technical solutions. Implementation principles and technical effects thereof are similar. Therefore, details are not described herein again.

Figure 9:
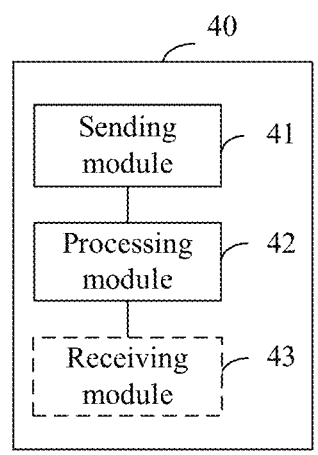
FIG. 9 is a schematic structural diagram of a fourth embodiment of an information transmission apparatus according to this application.

FIG. 9 is a schematic structural diagram of a fourth embodiment of an information transmission apparatus according to this application. As shown in FIG. 9, the information transmission apparatus 40 includes:

a sending module 41, configured to send system information to user equipment, where the system information includes second configuration information used to indicate a type of each unit time-frequency resource, the unit time-frequency resource includes a fixed quantity of orthogonal frequency division multiplexing OFDM symbols, and the type of the unit time-frequency resource includes: the unit time-frequency resource used to send uplink information, the unit time-frequency resource used to receive downlink information, or the unit time-frequency resource used to send uplink information and receive downlink information; and a processing module 42, configured to control the information transmission apparatus to exchange information with the user equipment based on the second configuration information.

Optionally, the processing module 42 is further configured to obtain interference intensity. The interference intensity is used to indicate a degree of interference of a neighboring cell signal to uplink or downlink transmission of a base station.

When the processing module 42 determines that the interference intensity is less than a preset interference intensity threshold, the sending module is further configured to send system information including first configuration information to the user equipment. The first configuration information is used to indicate a fixed-downlink time-frequency resource and a fixed-uplink time-frequency resource.

The information transmission apparatus provided in this embodiment is configured to perform the technical solution on the base station side in any one of the foregoing technical solutions. Implementation principles and technical effects thereof are similar. Therefore, details are not described herein again.

Further, the information transmission apparatus 40 further includes a receiving module 43, where the processing module 42 is further configured to: measure interference signal intensity of a neighboring cell at a predefined time-frequency resource location, and use the intensity as the interference intensity; or the receiving module 43 is configured to receive a channel state measurement report sent by the user equipment, where the channel state measurement report includes a downlink transmission signal-to-noise ratio; and the processing module 42 is further configured to obtain the interference intensity based on the downlink transmission signal-to-noise ratio; or the receiving module 43 is configured to: receive a channel sounding reference signal sent by the user equipment, and measure uplink transmission channel quality based on the channel sounding reference signal, to obtain the interference intensity.

The information transmission apparatus provided in this embodiment is configured to perform the technical solution on the base station side in any one of the foregoing technical solutions. Implementation principles and technical effects thereof are similar. Therefore, details are not described herein again.

Figure 10:
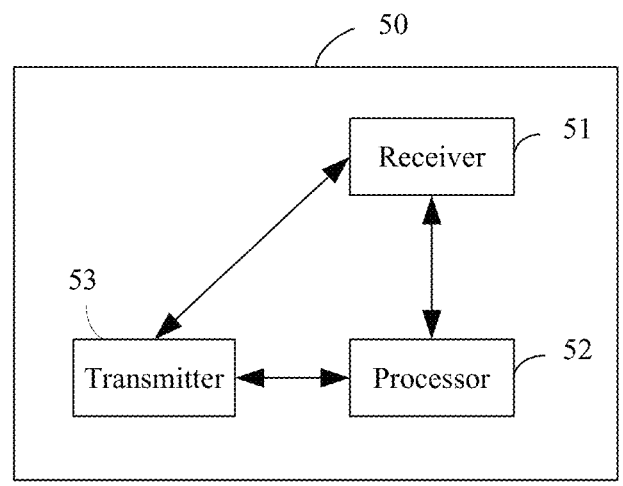
FIG. 10 is a schematic structural diagram of a first embodiment of user equipment according to this application.
Figure 11:
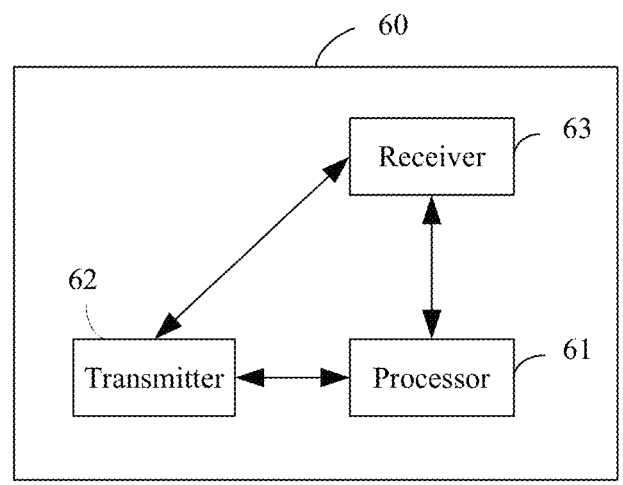
FIG. 11 is a schematic structural diagram of a first embodiment of a base station according to this application.

FIG. 10 is a schematic structural diagram of a first embodiment of user equipment according to this application. FIG. 11 is a schematic structural diagram of a first embodiment of a base station according to this application. As shown in FIG. 10 and FIG. 11, in the embodiments of this application, when an information transmission apparatus is user equipment 50, a receiving module may be implemented by a receiver 51 in FIG. 10, a processing module may be implemented by a processor 52 shown in FIG. 10, and a sending module may be implemented by a transmitter 53 shown in FIG. 10. When an information transmission apparatus is a base station 60, a processing module may be implemented by a processor 61 shown in FIG. 11, a sending module may be implemented by a transmitter 62 shown in FIG. 11, and a receiving module may be implemented by a receiver 63 shown in FIG. 11.

In a specific implementation, the user equipment or the base station may further include a computer program and a memory. The computer program is stored in the memory, and the processor runs the computer program, to perform the foregoing tracking processing method of the UE in a low power mode. There is at least one processor, configured to execute an execution instruction, namely, the computer program, stored in the memory. In this way, the user equipment exchanges data with the base station by using a communications interface, to perform the information transmission method provided in each implementation of the foregoing aspects. Optionally, the memory may be further integrated into the processor.

This application further provides a storage medium, including a readable storage medium and a computer program. The computer program is used to implement the information transmission method on a user equipment side provided in any one of the foregoing embodiments.

This application further provides a storage medium, including a readable storage medium and a computer program. The computer program is used to implement the information transmission method on a base station side provided in any one of the foregoing embodiments.

This application further provides a program product. The program product includes a computer program (namely, an execution instruction), and the computer program is stored in a readable storage medium. At least one processor of user equipment may read the computer program from the readable storage medium, and the at least one processor executes the computer program, so that the user equipment implements the information transmission method provided in the foregoing implementations.

This application further provides a program product. The program product includes a computer program (namely, an execution instruction), and the computer program is stored in a readable storage medium. At least one processor of a base station may read the computer program from the readable storage medium, and the at least one processor executes the computer program, so that the base station implements the information transmission method provided in the foregoing implementations.

It should be further understood that in the foregoing user equipment and base station embodiments, the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the method disclosed with reference to the embodiments of this application may be directly performed by a hardware processor, or may be performed by using a combination of hardware and software modules in the processor.

A person of ordinary skill in the art may understand that all or some of the steps of the method embodiments may be implemented by a program instructing relevant hardware. The program may be stored in a computer-readable memory. When the program is executed, the steps of the method embodiments are performed. The memory (such as storage medium) includes: a read-only memory (ROM), a RAM, a flash memory, a hard disk, a solid state disk, a magnetic tape, a floppy disk, an optical disc, and any combination thereof.

Finally, it should be noted that the foregoing embodiments are merely intended for describing the technical solutions of this application, rather than limiting this application.

What is claimed is:

1. A communication method, comprising:
receiving, by user equipment, system information from a base station, wherein the system information comprises first configuration information, wherein
the first configuration information indicates that at least one first orthogonal frequency division multiplexing (OFDM) symbol is a fixed-downlink resource in a first slot, and the first configuration information does not indicate transmission direction of the other symbols other than the at least one first OFDM symbol in the first slot, a quantity of the at least one first OFDM symbol is less than a quantity of OFDM symbols in the first slot, the at least one first OFDM symbol starts from a start location of the slot in time domain;
the first configuration information indicates that at least one second OFDM symbol is a fixed-uplink resource in a second slot, and the first configuration information does not indicate transmission direction of the other symbols other than the at least one second OFDM symbol in the second slot, a quantity of the at least one second OFDM symbols is less than a quantity of OFDM symbols of the second slot, the at least one second OFDM symbol ends at an end location of the slot in time domain;
the first configuration information does not indicate a type of the first slot and the first configuration information does not indicate a type of the second slot, wherein the type of the first slot or the type of the second slot is one of: a slot used to send uplink information, a slot used to receive downlink information, or a slot used to send uplink information and receive downlink information; and
obtaining, by the user equipment according to the first configuration information, information on a fixed-downlink resource or configuring, by the user equipment according to the first configuration information, information to be carried on a fixed-uplink resource.

2. The method according to claim 1, wherein the method further comprises:
obtaining, by the user equipment, downlink control information (DCI) from the base station, wherein the DCI indicates the type of the first slot or the type of the second slot.

3. An apparatus, comprising:
one or more processors, and
a storage medium configure to store program instructions;
wherein, when executed by the one or more processors, the program instructions cause the apparatus to perform operations comprising:
receiving system information from a base station, wherein the system information comprises first configuration information, wherein
the first configuration information indicates that at least one first orthogonal frequency division multiplexing (OFDM) symbol is a fixed-downlink resource in a first slot, and the first configuration information does not indicate transmission direction of the other symbols other than the at least one first OFDM symbol in the first slot, a quantity of the at least one first OFDM symbol is less than a quantity of OFDM symbols in the first slot, the at least one first OFDM symbol starts from a start location of the slot in time domain;
the first configuration information indicates that at least one second OFDM symbol is a fixed-uplink resource in a second slot, and the first configuration information does not indicate transmission direction of the other symbols other than the at least one second OFDM symbol in the second slot, a quantity of the at least one second OFDM symbols is less than a quantity of OFDM symbols of the second slot, the at least one second OFDM symbol ends at an end location of the slot in time domain;

the first configuration information does not indicate a type of the first slot and the first configuration information does not indicate a type of the second slot, wherein the type of the first slot or the type of the second slot is one of: a slot used to send uplink information, a slot used to receive downlink information, or a slot used to send uplink information and receive downlink information; and obtaining information on a fixed-downlink resource according to the first configuration information or configuring information to be carried on a fixed-uplink resource according to the first configuration information.

4. The apparatus according to claim 3, wherein the operations further comprises:

obtaining downlink control information (DCI) from the base station, wherein the DCI indicates the type of the first slot or the type of the second slot.

5. A non-transitory computer readable medium, having instruction recorded thereon; wherein the instruction makes a computer perform operations comprising:

receiving system information from a base station, wherein the system information comprises first configuration information, wherein the first configuration information indicates that at least one first orthogonal frequency division multiplexing (OFDM) symbol is a fixed-downlink resource in a first slot, and the first configuration information does not indicate transmission direction of the other symbols other than the at least one first OFDM symbol in the first slot, a quantity of the at least one first OFDM symbol is less than a quantity of OFDM symbols of the first slot, the at least one first OFDM symbol starts from a start location of the slot in time domain;

the first configuration information indicates that at least one second OFDM symbol is a fixed-uplink resource in a second slot, and the first configuration information does not indicate transmission direction of the other symbols other than the at least one second OFDM symbol in the second slot, a quantity of the at least one second OFDM symbols is less than a quantity of OFDM symbols of the second slot, the at least one second OFDM symbol ends at an end location of the slot in time domain;

the first configuration information does not indicate a type of the first slot and the first configuration information does not indicate a type of the second slot, wherein the type of the first slot or the type of the second slot is one of: a slot used to send uplink information, a slot used to receive downlink information, or a slot used to send uplink information and receive downlink information; and obtaining information on a fixed-downlink resource according to the first configuration information or configuring information to be carried on a fixed-uplink resource according to the first configuration information.

6. The non-transitory computer readable medium according to claim 5, wherein the operations further comprises:

obtaining downlink control information (DCI) from the base station, wherein the DCI indicates the type of the first slot or the type of the second slot.

* * * * *

UNITED STATES PATENT AND TRADEMARK OFFICE
CERTIFICATE OF CORRECTION

PATENT NO. : 11,303,400 B2
APPLICATION NO. : 16/367864
DATED : April 12, 2022
INVENTOR(S) : Xu Zhang et al.

Page 1 of 1

It is certified that error appears in the above-identified patent and that said Letters Patent is hereby corrected as shown below:

In the Specification

In Column 1 Line 8 (Approx.), Delete "PCT/CN 2017/100732," and insert
-- PCT/CN2017/100732, --.

Signed and Sealed this
Twenty-sixth Day of July, 2022

Katherine Kelly Vidal
*Director of the United States Patent and Trademark Office*